United States Patent Office 3,302,980
Patented Feb. 7, 1967

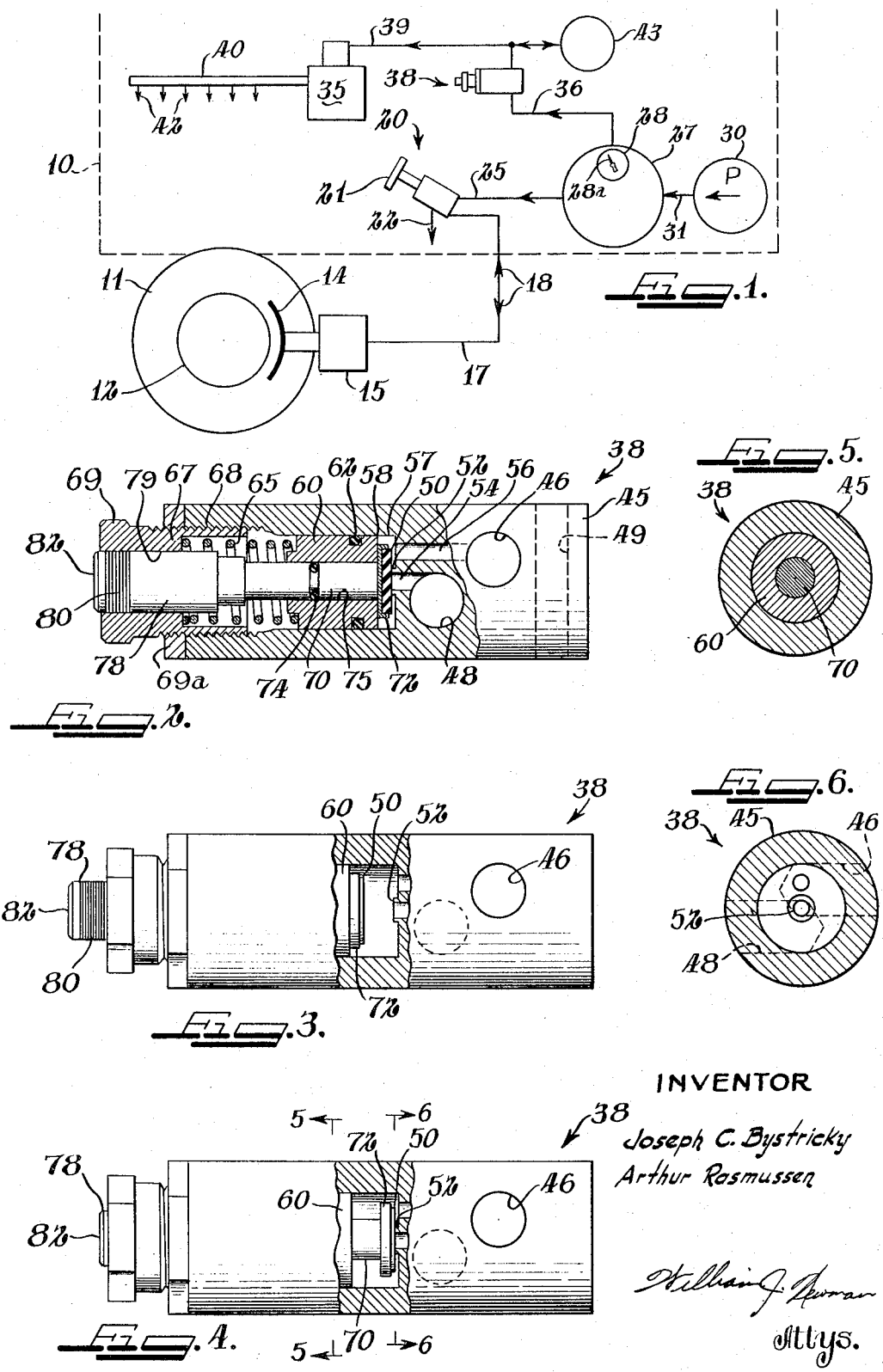

3,302,980
FLUID AND MANUAL ACTUATED VALVE
Joseph C. Bystricky, Crystal Lake, and Arthur Rasmussen, Elk Grove Village, Ill., assignors to Stewart-Warner Corporation, Chicago, Ill., a corporation of Virginia
Filed Aug. 10, 1964, Ser. No. 388,505
10 Claims. (Cl. 303—5)

The present invention relates to new and improved valve means for use in apparatus having a plurality of pressurized fluid operated devices, and is more particularly directed to a quick-opening, quick-closing valve which is operable automatically under the influence of fluid pressure to open and to close a port in response to predetermined pressure variations, which automatic operation may be manually overridden to positively close the port, when desired.

A valve constructed in accordance with the present invention is both automatically and manually operable under predetermined conditions to control supply of fluid under pressure to one pressure actuated device and to permit supply of a desired quantity of pressurized fluid to another pressure actuated device. A valve constructed in accordance with the present invention has particular application in motor vehicles, such as trucks, for controlling operation of an air pressure operated oil-mist lubrication system in the vehicle and for alternatively permitting supply of a desired quantity of pressurized air to the air pressure operated brake system of the vehicle when the lubricating system and brake system are both supplied air from a common source of pressurized air.

The present invention is also directed to a valve operable automatically to open and close, respectively, above and below maximum and minimum values of a predetermined pressure differential of operation in a pressurized air supply system for supplying pressurized air to both an oil-mist lubrication system and to an air brake system from a common source of pressurized air. With such an air supply system, when the pressure, acting on the valve is above a predetermined value, for example, is above 80 p.s.i., the valve is automatically opened to supply air under pressure to the oil-mist system. When the pressure in the valve drops below 70 p.s.i., for example, the valve closes automatically, whereby the air brakes will then receive a maximum amount of pressurized air from the common source of air supply.

It is common practice, according to state safety regulations, for state inspectors to make brake checks of truck vehicles at check points. During such brake checks, it is desirable to have auxiliary air operated equipment supplied from the same source of pressurized air as the brake system shut off for the duration of the brake test. Such tests generally comprise application of full brake for a predetermined length of time while the rate of drop, or pressure change in the air brake system, is read on a pressure gauge by the inspector. With the oil-mist system to be described chiefly below, about two cubic feet per minute of pressurized air can be consumed from the common source of pressurized air.

If the oil-mist lubrication system is operating while the compressor for the air pressure system is not in operation, an erroneous test indication of the rate of leakage of air through the brake system would result. In fact, a true pressure reading under such conditions is not possible without employment of a valve of some kind, and is significantly facilitated by a valve of the kind to be described below.

Accordingly, it is a broad object of this invention to provide a new and improved automatically or manually actuatable fluid control valve for controlling operation of a pressurized air operated device in a pressure system.

A more specific object of the present invention in keeping with the above object is to provide a new and improved pressure actuated valve including manually actuatable means for overriding automatic operation of the valve when desired.

Another object of the present invention is to provide a piston operated valve and auxiliary means carried by the piston for controlling operation of the valve.

A further object of the present invention is to provide a valve actuatable either manually or automatically for controlling the operation of one pressure operated device in a pressure system including at least two pressure operated devices connected to a common source of air supply.

A still further object of the present invention is to provide a control valve in a vehicle having pressure operated brakes and an oil-mist lubrication system supplied from a common source of pressurized air, said valve being operable to automatically render the lubricating system inoperative, when pressure in the valve falls below a predetermined value, said lubrication system being capable of also being rendered inoperative by manual override of the automatic operation of the vehicle.

Other objects, features and advantages of the present invention reside in the construction and arrangement of the parts and systems and will be either obvious or pointed out in the specification and claims to follow, when read in view of the accompanying drawing in which:

FIG. 1 is a schematic view of a truck brake and lubricating system incorporating a valve constructed in accordance with the principles of the present invention;

FIG. 2 is a side view in partial elevation taken along the longitudinal axis of the valve of FIG. 1 and partially broken away to facilitate illustration of the valve in closed position;

FIG. 3 is a view similar to FIG. 2, but illustrating the valve of FIG. 2 in open position;

FIG. 4 is a view similar to FIG. 3 illustrating a device for overriding automatic operation of the value of FIG. 1;

FIG. 5 is a view in cross-section taken along line 5—5 of FIG. 4; and

FIG. 6 is a view in cross-section taken along line 6—6 of FIG. 4.

Referring now to the drawing and first to FIG. 1, the outline of a truck vehicle is indicated by dash line 10. The truck 10 has a plurality of ground engaging wheels 11, one of which is illustrated in FIG. 1. Rotation of the wheel 11 may be impeded by a brake shoe 14 in engagement with a brake drum 12 on the wheel 11. The brake shoe 14 may be any commercially available truck brake shoe and operation thereof may be actuated by any suitable pressurized air actuated motor 15. The motor 15 is illustrated in FIG. 1 as being supplied pressurized air by a single supply conduit 17, although it will be appreciated that the brake motor 15 may be supplied air by other conduit arrangements. Air in the conduit 17 flows to and from the brake motor 15 in the directions indicated by the arrowheads 18 in FIG. 1.

In order to control operation of the brake motor 15, a conventional, normally closed, three-way valve 20 is provided which may be operated by connection to a brake pedal 21 located in the operator's compartment of the truck 14.

Pressurized air is supplied via the conduit 17 to the motor 15, when the brake pedal 21 is depressed to open the valve 20, from a conduit 25 connected to a pressurized air storage tank 27. A vent conduit 22 connected to valve 20 is also provided to vent the valve 20 and thus vent the brake motor 15 to atmosphere when the brake pedal 21 is released. A Bourdon pressure gauge 28 is provided to provide visual indication of the pressure in the tank 27. Pressurized air is supplied to the tank 27 via a conduit 31 from a pump 30 driven by suitable connections (not shown) to the engine of the truck.

In addition to the air brake system described above, the truck illustrated in FIG. 1 includes a pressurized air operated oil-mist generator 35 which may be, for example, of any well-known type. The generator 35 operates to disperse oil in minute droplets for feeding of the droplets through a header 40 to numerous outlets 42 leading to bearings, gear boxes and other movable parts in the vehicle 10 requiring lubrication, these parts not being shown because they are well-known in the oil-mist lubricating and vehicle arts.

The brake system is supplied pressurized air from the same source as the oil mist lubricating system. As shown in FIG. 1, the oil-mist generator 35 is supplied pressurized air from the storage tank 27 via a supply line including a conduit 36, a normally closed, pressure-actuable valve 38 and a conduit 39. A suitably sized air accumulator 43 may be connected to the conduit 39 for assuring a supply of pressurized air to the generator 35 for brief periods of time, whenever the valve 38 is closed.

The valve 38 is of unique construction and operation and serves to automatically control operation of the oil-mist generator 35. Also, as hereinafter explained, the valve 38 can be manually actuated by the operator of the truck from the operator's compartment to override automatic operation of the valve in order to terminate operation of the oil-mist generator 35, when desired.

The details of construction and operation of the valve 38 will now be described. As illustrated in FIG. 2, the valve 38 includes a housing 45, preferably tubular in shape for economy of material, although it will be appreciated other shapes can be employed, as desired, in keeping with the present invention.

The housing 45 is provided with an air inlet port 46 in communication with the storage tank outlet conduit 36 (FIG. 1) and with an air outlet port 48 in communication with the oil-mist generator inlet conduit 39 (FIG. 1). The ports 46 and 48 are preferably drilled on opposite sides of the housing 45 and transversely of the longitudinal axis of the housing 45. A cross-drill 49 may be provided at one end of the housing 45 for mounting the valve 38 in the operator's compartment in the vehicle, or any other suitable attachment means may be employed to mount the valve 38.

An elongated valve piston bore 58 is axially formed in the housing 45 and terminates inwardly of the ports 46 and 48. An inlet passageway 56 of lesser diameter than the bore 58 and extending parallel to the bore 58 is formed in the housing 45 to communicate the inlet bore 46 with the bore 58. Similarly, an outlet passageway 54 of lesser diameter than the bore 58 and extending axially with, or parallel to, the bore 58 is formed in the housing 45 to communicate the outlet port 48 with the bore 58.

A piston 60 is disposed in the bore 58 to define with the end wall of the bore 58 a chamber 57 adjacent the inner end of the bore 58. With the piston 60 disposed in the bore 58, the ports 46 and 48 are in fluid communication with the chamber 57. Carried by the piston 60 is an O-ring 62 which serves to seal the chamber 57 and prevent air flow between the outer surface of the piston 60 and wall of the housing defining the diameter of bore 58.

The piston 60 is biased towards the transverse end wall of the bore 58 in chamber 57 by a compression spring 65 disposed in the bore 58. The spring 65 is seated at one end against the piston 60 and is seated at its other end against a spring adjustment sleeve 67 which is externally threaded, as indicated at 68, in a counterbore formed in the housing 45. The adjustment sleeve 67 is provided with an outer head 69 suitably shaped so that the sleeve 67 may be adjusted to vary compression of the spring 65, as hereinafter explained.

A stepped piston rod 70 is freely movable within an axial bore 79 in the sleeve 67 and slidably disposed within an axial guide bore 75 formed in piston 60. An O-ring 74 externally carried by the piston rod 70 prevents air flow along the piston rod 70 and a suitable lubricant is provided to facilitate reciprocal movement of the piston rod 70.

A cup 72, formed as an integral part of the rod 70 or secured thereto, is located at the inner end of rod 70 in chamber 57. The cup 72 carries a valve head disc 50, constructed preferably of a soft resilient rubber-like material secured thereto as by cementation.

When the piston 60 engages the cup 72, the force of the spring 65 on the piston 60 tends to urge the valve disc 50 into engagement with a valve seat 52 of the outlet passageway 54. The valve seat 52 is defined by a boss extending into the chamber 57. When the valve disc 50 engages the seat 52, the passageway 54 is closed, and air flow from the air outlet 48 to the oil-mist generator 35 is terminated.

The rod 70, at the end opposite the valve cup 72, has an elongated plunger 78 which freely fits in the bore 79 in the adjusting sleeve 67. The outer portion 80 of the plunger 78 near its outer end may be colored red to visually indicate to the operator of the vehicle whether the valve, i.e., the passageway 54, is open or closed. This red portion is sized so that it will be concealed when the valve is closed, as shown in FIGS. 2 and 4, but will be exposed when the valve is open, as shown in FIG. 3.

The plunger 78 and the rod 70 provide manually actuatable means by which the operator may hold the valve disc 50 in engagement with the seat 52, against the force of air pressure in chamber 57, to close outlet passageway 54 and thereby override automatic operation of the valve 38. It will be observed that, when the operator manually pushes the plunger 78 inwardly, the piston 60 will tend to follow the cup 72 towards the valve seat 52, and the force of spring 65 acting on the piston 60 will provide an additional biasing force to aid the operator in manually closing the valve outlet passageway 54. This follower feature of the spring and piston arrangement, it will be appreciated, is advantageous, particularly in valves employed in high pressure systems.

From the foregoing description, it will be appreciated that the air pressure at inlet port 46 will be substantially the same as the air pressure in the chamber 57. Air pressure in the chamber 57 acts against the piston 60 and the peripheral areas of disc 50 and cup 72 tending to move the valve disc 50 away from its seat 52 against the force of the spring 65 to open the outlet passageway 54 for supply of air to the oil-mist generator 35. The primary force, therefore, resisting this movement of these parts from the location of the valve seat, when no manual force is exerted against plunger 78, will be generally dependent upon the compressive force of spring 65.

To calibrate the pressure response of the valve 38, adjustment sleeve 67 is threaded in the housing 47 to adjust the compression of the spring 65, until the valve will open the outlet passageway 54, when approximately 80 p.s.i. pressure exists in chamber 57. Thereafter, adjustment sleeve 67 is locked in place by a lock nut 69a (FIG. 2). This pressure adjustment can conveniently be made by use of snap-on connectors adjacent ports 46 and 48, and by use of a device for indicating flow of air out of the outlet port 48, when 80 p.s.i. pressure is applied at the inlet port 46.

*Automatic operation*

When air pressure rises in the chamber 57, the pressure forces exerted upon the peripheral area of the valve disc 50 and on the peripheral area of the end of the piston 60 overcome the force of the spring 65 so that the valve disc 50 is moved from its seat 52 to open the passageway 54 and the outlet 48 when a pressure of 80 p.s.i. is attained in chamber 57. However, once open, the effective surface area of the surface acted on by fluid pressure will be increased by the area of the valve disc 50 equal to the area defined by the area of the passageway 54 and seat 52, and, accordingly, the valve will snap open by pressure response of this increase in exposed surface area of the disc 50. On the reverse motion, as air pressure falls, the valve disc 50 will snap closed as the port 52 is touched by the valve disc 50 to effect a reverse-acting quick closure of the valve. Thus, there is provided by the present invention a valve device operable to automatically open and close the supply line to the oil-mist generator in response to a predetermined pressure change in the valve chamber 57.

Another feature of the present invention resides in automatic closing of outlet 48 by valve 38 to de-activate the oil-mist generator 35 during those intervals wherein the brake system is actuated. Automatic closing of outlet 48 and de-activation of the oil-mist generator 35 may become periodically necessary, for example, when there is a large air supply demand on the brake system, such as when braking in stop-and-go traffic or when braking down hill. Since under any of these braking conditions, sufficient air must be supplied to the brake system by the tank 27 to effect safe stopping of the vehicle, it will be appreciated that the present invention will effect such safe stopping because the valve 38 will close immediately when pressure in chamber 57 drops below the predetermined value of 70 p.s.i., such pressure drop occurring by imposition of a greater pressure demand on the common supply of air in the tank 27 by opening of the brake valve 22 to the brake motor 15 than the pressure demand on the common air supply of the oil-mist generator 35. The air supply from the tank 27 will, upon closing of valve 38, be directed entirely to the brake motor 15 via the conduit 25 to assure an adequate supply of pressure to the brake motor 15. And whenever the air brake supply demand ceases, the air pressure in chamber 57 will increase to 80 p.s.i. and the valve 38 will automatically open to permit resumption of operation of the oil-mist lubricating system.

*Manual operation*

Also among the features of the present invention are the features (a) that only a relatively small manually applied force on the plunger 78 is required to be exerted by the operator to override the above-described automatic operation of the valve 38 and to hold the valve in closed position against the air pressure in chamber 57 and (b) that the operator can "feel" when the valve 38 is closed during such manual overriding operation.

With different sizes of valves operated at different pressures, the cross-sectional areas of the piston 60 and the rod 70 and diameters of the valve seat 52 (FIG. 6) and of the rod 70 (FIG. 5) are preferably so selected that when by manual actuation of the rod 70 the valve disc 50 is held in engagement with the valve seat 52 and the piston 60 is moved from engagement with the rear surface of the valve cut 72 by air pressure, the force required to be supplied by the finger of the operator to the end 82 of the plunger 78 against the air pressure in chamber 57 to override the automatic operation of the valve 38 is of a low order of only a few pounds, for example, two or three pounds being considered sufficient for many uses of the device. In the example given, the cross-sectional area of piston 60 is approximately seven times the cross-sectional area of the rod 70, and the external diameter of the valve seat 52 (FIG. 6) is less than the diameter of the rod 70 (FIG. 5). With such dimensional proportions of these parts, even though a substantially higher pressure may be required to be applied at the end 82 to move the valve disc 50 in engagement with the seat 52, once closure is completed, the force necessary to keep the valve closed is automatically reduced.

FIG. 3 illustrates the valve disc 50 when automatically moved from engagement with the valve seat 52 by the influence of air pressure in chamber 57 to permit flow of air to the oil-mist generator 35. The rod 70 is shown in a position exposing the red marked area 80 at the end of the plunger 78 for visual inspection by the operator to indicate that the valve 38 is open and air is being supplied to the oil-mist generator.

With the area 80 so exposed, the operator, at the time of a brake inspection or at any other required time, can move the piston 70 into the housing 45 against the air pressure in chamber 57 to close the passageway 54 and thereby terminate air flow to the oil mist generator by applying a force to the end surface 82 of the piston 70 with his thumb or finger, until the valve disc 50 engages the valve seat 52. When the valve disc 50 engages the seat 52, the back pressure on the pressure applying finger of the operator decreases sharply to give a "feel" that the valve disc 50 has engaged the seat 52. At this time, only a small force need be applied by the operator to maintain the valve disc 50 in engagement with the seat 52.

The operator's finger need remain in engagement with the end 82 of the plunger only until such time as the pressure in chamber 57 is reduced to below 80 p.s.i. for when the pressure in chamber 57 is reduced to below 80 p.s.i., the spring 65 will have moved the piston 60 into engagement with the rear surface of the cup 72 to hold the valve disc 50 against its seat 52 and thereby reduce substantially to zero the holding force required to be exerted by the operator on the plunger 78 to hold the disc 50 in engagement with the seat 52.

During brake inspections, the operator normally depresses the brake pedal 21 to hold the brake shoes in engagement with the brake drums of the wheels for a period of time, during which time the brake inspector will observe the pressure gauge 28 on the pressurized-air supply tank 27 to determine whether the pointer 28*a* of the gauge 28 indicates a drop of a predetermined number of pounds of air pressure which would in turn indicate air pressure losses, if any, in the braking system.

In the prior art systems, with the oil-mist generator 35 being operative during the brake testing interval, an inaccurate reading from the gauge 28 of brake system air pressure occurs because of the continuous demand on the air supply in the storage tank 27 by the oil-mist generator. In order to avoid such inaccurate readings of the brake system pressure, the operator may de-activate the oil-mist generator 35 by actuation of the plunger 78 to close the outlet 54 as described above, while maintaining the brake air supply system in operation.

FIG. 4 illustrates the valve 38 in closed position with the automatic operation thereof overridden by the operator's actuation of the rod 70 to close the outlet 48. In the position shown in FIG. 4, even though piston 60 is in a valve opening position, the warning area 80 of the plunger is still concealed indicating visually to the operator that the valve disc 50 is in engagement with the valve seat 52.

Another feature of this invention resides in a cooperable function between the automatically actuated piston 60 and the automatically and manually actuated piston 70, when the pressure in the chamber 57 is in the range of about 78 p.s.i. and under 80 p.s.i. At 79 p.s.i., by way of example, with the piston 70 being manually biased by an operator in valve closing direction, as the back of the cup 72 tends to leave the face of piston 60, the spring 65 will drive the piston 60 behind the valve cup 72 and augment the force applied by the operator. Hence, under such pressure controlled conditions, large valves can be manually operated against relatively high fluid pressures by applying a small force on the end 82 of the plunger 78, or the like.

While a preferred embodiment, method, and system of the present invention have been explained in detail herein, obviously modifications thereof will occur to others skilled in the art. Accordingly, we do not wish to be limited to details of construction, but by the spirit and scope of the sub-joined claims.

We claim:

1. In a pressurized fluid control valve having an inlet passageway and an outlet passageway, automatically movable means biased in a valve closing direction and movable by fluid pressure in a valve opening direction, valve means moved in a valve closing direction by said movable means to a position for preventing the transmission of fluid between said inlet passageway and said outlet passageway with said valve means having means responsive to fluid pressure at said inlet passageway for moving to a second position independently of said movable means to permit the passage of fluid between said inlet passageway and outlet passageway while pressure at said inlet passageway is simultaneously exerted against said movable means, and means for manually moving said valve means in a valve closing direction.

2. In a pressurized fluid control valve, automatically movable means including piston means biased in a valve closing direction and movable by fluid pressure in a valve opening direction, valve means having an area of smaller peripheral dimension than said movable means exposed to fluid pressure and moved in said valve closing direction by said movable means for closing said valve and movable in said valve opening direction independently of said movable means in response to fluid pressure exerted in said valve opening direction against said valve means and movable means respectively, and means for manually moving said valve means in said valve closing direction independently of said movable means and solely against the fluid pressure applied to said area of smaller peripheral dimension.

3. In a vehicle having an air-pressure-actuated brake system and an oil-mist lubricating system supplied with air from a common source with said oil mist system continuously venting said air to atmosphere, control means for said lubricating system including automatic air-pressure operated valve means enabling the passage of air to said lubricating system from said source in response to a predetermined air pressure applied from said source to said valve means with said valve means including means for automatically maintaining the passage of said air from said source to said oil mist system in the event said pressure thereafter diminishes and for terminating said passage of air to said oil mist system in the event said pressure diminishes to a predetermined value, and means for manually operating said valve means when the air pressure applied to said valve means is above said predetermined air pressure for terminating the air supply to said lubricating system.

4. A pressurized fluid control valve comprising a body forming a valve seat of predetermined diameter, a valve member movable to and from said seat, a cylindrical bore in one end of said body, a centrally apertured piston carried in said bore, means biasing said piston toward said valve seat, abutting surfaces between said piston and said valve member, a source of fluid pressure for supplying pressurized fluid into said bore on the same side of said piston as said valve seat for causing fluid pressure fluctuations above and below a preselected pressure to respectively move said piston away from and back toward said seat, manual means including a piston rod of a preselected diameter larger than said valve seat operably associated with said valve member and being slideably mounted in the aperture of said piston, said piston rod being connected with said valve member on the abutting surface thereof, said piston moving said valve member away from said seat due to the pressurized fluid force difference between the piston rod diameter and the valve seat diameter, and an extension of said piston rod external of said valve body at least when said valve member is away from said seat for manually moving said valve member toward said seat regardless of fluid pressure in said bore.

5. A control valve having a chamber with an inlet port and an outlet port, an axially movable valve in said chamber having one face for sealing one of said ports closed to prevent the passage of fluid from said inlet port to said outlet port with the major area of said valve in said chamber exposed to fluid pressure from said inlet port to solely bias said valve for movement in one direction for opening said one port, axially movable piston means engaged by said valve and having a face exposed to fluid pressure from said inlet port for movement in said one direction concurrently with said valve being moved solely by said fluid pressure in said one direction from said one port, biasing means engaging said piston means for biasing said piston means and said valve in a direction for sealing said one port closed with the force of said biasing means opposed by the fluid pressure applied to both said faces, and manually operable means for operating said valve independently of said piston means and only against the force of said fluid pressure applied to said one face for sealing said one port closed.

6. A control valve having a chamber with an inlet port and an outlet port, a valve in said chamber having one face for sealing engagement with said outlet port to prevent the passage of fluid from said inlet port through said outlet port with a major area of said face exposed to fluid pressure from said inlet port to solely bias said valve for movement in one direction for opening said outlet port, a piston sealingly engaged with the wall of said chamber to prevent the passage of fluid between said wall and said piston with one face of said piston being of larger peripheral dimension than said one face of said valve and engaged by said valve for movement in said one direction concurrently with said valve being moved solely by said fluid pressure in said one direction from said port to expose the entire area of said one face of said valve to sudden fluid pressure passing between said inlet and outlet ports, biasing means engaging said piston for biasing said piston and valve in a direction for sealing said outlet port with the force of said biasing means opposed by the fluid pressure applied from said inlet port to said faces whereby said valve is moved away from said outlet port in response to the application of a predetermined fluid pressure against said faces and whereafter fluid pressure applied to both said faces including the entire area of said one face permits said valve to remain open until said pressure drops to another predetermined value, and sealed means for applying a force through said piston to said valve for permitting manual operation of said valve independently of said piston and against the force of said fluid pressure applied to said one face of said valve only to seal said outlet port closed.

7. A control valve having a chamber with an inlet port and an outlet port, a valve in said chamber having one face for sealing said outlet port to prevent the passage of fluid from said inlet port through said outlet port with the major area of said one face exposed to fluid pressure from said inlet port to solely bias said valve for movement in one direction for opening said outlet port, piston means having a face of larger peripheral dimension than said one face for exposure to fluid pressure from said inlet port to bias said piston means for movement in said one direction concurrently with said valve and engaged by said valve on movement of said valve in said one direction solely by said fluid pressure, biasing means engaging said piston means for biasing said piston means and said engaged valve in a direction for sealing said outlet port closed with the force of said biasing means opposed by the fluid pressure applied to both said faces including the total area of said one face exposed to said fluid pressure in response to said one face being moved from said outlet port by said fluid pressure to permit the passage of fluid between said inlet and outlet ports, and manually operable sealed means for applying a force to said valve alone for permitting manual operation of said valve independently of said piston means and against the force of said fluid pressure applied to said one face only to seal said outlet port closed.

8. A control valve having a chamber with an inlet port and an outlet port, an axially movable valve in said chamber having one face with a minor portion thereof arranged for sealing engagement with said outlet port to prevent the passage of fluid from said inlet port to said outlet port and the major portion of said face exposed to fluid pressure from said inlet port to solely bias said valve for axial movement from said outlet port, an axially movable piston with one face of said piston being coplanar to said valve face and of larger area than said valve face and engaged by said valve on movement of said valve from said port solely by said fluid pressure for exposing the total area of said valve face to fluid pressure passing between said inlet and outlet ports, biasing means engaging said piston for biasing said piston and valve in a direction for sealing said outlet port closed with the force of said biasing means opposed by the fluid pressure applied from said inlet port to said piston face whereby said valve is moved from said inlet port in response to the application of one predetermined fluid pressure whereafter fluid pressure applied to both said major and minor portions of said valve face permits said valve to remain open until said pressure drops to another predetermined pressure below said one predetermined fluid pressure, a shaft extending through said piston to a position external said chamber and engaging said valve for manually moving said valve axially independently of said piston and against the force of said fluid pressure applied to said valve face only to seal said outlet port closed whereafter the manual force required to hold said outlet port closed is reduced by a factor dependent on the area of said minor portion.

9. For use in a vehicle having a common air pressure source for operating a brake system and an oil mist lubricating system with said oil mist system continuously venting air from said supply to atmosphere, the improvement comprising a valve interposed between said source and said oil mist system, means for biasing said valve closed to prevent the passage of air to said oil mist system from said source, means for applying air from said source separately to said valve and said biasing means for operating said valve in response to the application of one predetermined air pressure from said source counteracting said bias, means for thereafter maintaining said valve open until said air pressure drops to another predetermined pressure below said one pressure, and means for manually operating said valve to disconnect said supply from said source irrespective of said air pressure being above either said one or other predetermined pressure.

10. The apparatus claimed in claim 9 in which said means for manually operating said valve moves said valve solely against the air pressure applied to said valve and independently of the air pressure applied to said biasing means.

References Cited by the Examiner

UNITED STATES PATENTS

| 635,149 | 10/1899 | Schreidt | 137—489.5 |
| 1,025,340 | 5/1912 | Turner | 303—5 |
| 2,942,917 | 6/1960 | Swander | 303—5 |

FOREIGN PATENTS 1,094,067  12/1960  Germany.

EUGENE G. BOTZ, *Primary Examiner.*